(12) United States Patent
Kojima et al.

(10) Patent No.: US 12,120,403 B2
(45) Date of Patent: Oct. 15, 2024

(54) CONTENT GENERATION DEVICE, CONTENT DISTRIBUTION SERVER, CONTENT GENERATION METHOD, AND CONTENT GENERATION PROGRAM

(71) Applicant: DWANGO Co., Ltd., Tokyo (JP)

(72) Inventors: Takashi Kojima, Tokyo (JP); Kazuomi Niwa, Tokyo (JP)

(73) Assignee: DWANGO CO., LTD. (JP)

( * ) Notice: Subject to any disclaimer, the term of this patent is extended or adjusted under 35 U.S.C. 154(b) by 0 days.

(21) Appl. No.: 17/765,017

(22) PCT Filed: Dec. 24, 2020

(86) PCT No.: PCT/JP2020/048350
§ 371 (c)(1),
(2) Date: Mar. 30, 2022

(87) PCT Pub. No.: WO2021/132428
PCT Pub. Date: Jul. 1, 2021

(65) Prior Publication Data
US 2022/0377435 A1    Nov. 24, 2022

(51) Int. Cl.
*H04N 21/854* (2011.01)
*H04N 21/232* (2011.01)
(Continued)

(52) U.S. Cl.
CPC ......... *H04N 21/854* (2013.01); *H04N 21/232* (2013.01); *H04N 21/234* (2013.01); *H04N 21/262* (2013.01)

(58) Field of Classification Search
CPC .. H04N 21/854; H04N 21/232; H04N 21/234; H04N 21/262
See application file for complete search history.

(56) References Cited

U.S. PATENT DOCUMENTS 9,094,738 B2 * 7/2015 Kishore ........... H04N 21/23439
9,715,901 B1 * 7/2017 Singh .................. H04N 21/8547
(Continued)

FOREIGN PATENT DOCUMENTS

CN  101371488 A  2/2009
CN  104012101 A  8/2014
(Continued)

OTHER PUBLICATIONS

PCT/JP2020/048350 International Search Report dated Mar. 9, 2021, 2 pgs.
(Continued)

*Primary Examiner* — Mulugeta Mengesha
(74) *Attorney, Agent, or Firm* — Bracewell LLP; Doug F. Stewart; Patrick J. Connolly (57) ABSTRACT

To provide a content generating device, content streaming server, content generating method, and content generating program for generating highly interesting video content. A content generating device according to an embodiment comprises: an acquiring portion for requesting, from an accumulating portion that accumulates a plurality of video data, video data that satisfies a prescribed condition, to acquire a plurality of video data that satisfies the condition; a starting frame identifying portion for identifying starting frames wherein prescribed actions start, in the video playback of the plurality of video data acquired by the acquiring portion; and a generating portion for generating multi-video data by combining a plurality of video data with the timings of the identified starting frames synchronized.

5 Claims, 7 Drawing Sheets (51) Int. Cl.
*H04N 21/234* (2011.01)
*H04N 21/262* (2011.01)

(56) References Cited

U.S. PATENT DOCUMENTS

| | | | | |
|---|---|---|---|---|
| 10,419,384 | B2* | 9/2019 | Gross | H04N 21/4316 |
| 10,516,911 | B1* | 12/2019 | Nielsen | H04N 21/4223 |
| 2014/0068681 | A1* | 3/2014 | Lemmey | H04N 21/242 |
| | | | | 725/74 |
| 2015/0262017 | A1* | 9/2015 | Oguchi | G06F 16/7834 |
| | | | | 382/190 |
| 2018/0308523 | A1* | 10/2018 | Silvestri | H04L 65/611 |

FOREIGN PATENT DOCUMENTS

| | | |
|---|---|---|
| JP | 2003167575 A | 6/2003 |
| JP | 2005141018 A | 6/2005 |
| JP | 2008199557 A | 8/2008 |
| JP | 2011059619 A | 3/2011 |
| JP | 2012182724 A | 9/2012 |
| JP | 2012209856 A | 10/2012 |
| JP | 2014064135 A | 4/2014 |
| JP | 2014109657 A | 6/2014 |
| JP | 2014186177 A | 10/2014 |
| JP | 2018155936 A | 10/2018 |
| WO | 2019021342 A1 | 1/2019 |

OTHER PUBLICATIONS

CN202080063772.3 Office Action dated Apr. 21, 2023, 24 pgs.
CN202080063772.3 Office Action dated Sep. 27, 2023, 35 pgs.
JP20202027399 Notice of Reasons for Refusal dated Apr. 16, 2024, 14 pgs.
JP2020207399 Notice of Reasons for Refusal dated Jan. 9, 2024, 8 pgs.

* cited by examiner

CONTENT GENERATION DEVICE, CONTENT DISTRIBUTION SERVER, CONTENT GENERATION METHOD, AND CONTENT GENERATION PROGRAM

FIELD OF TECHNOLOGY

The present invention relates to a content generating device, a content streaming server, a content generating method, and a content generating program.

PRIOR ART

Conventionally, technologies have been provided for streaming a variety of video content through a network. Additionally, accompanying the rise of mobile communication terminals and the ability to engage in high-speed communications, it has become possible for more people to distribute videos they have taken themselves, resulting in the accumulation of large amounts of video content from the past.

It has also become possible to produce new video content by, for example, combining new video data with data for video content from the past. It has also become possible to produce video content through combining real-time, video data. For example, Patent Document 1 discloses a live video streaming system that produces video content, using video data captured by a plurality of imaging devices, with the video content in a state that is arranged based on the respective imaging positions of the plurality of imaging devices.

PRIOR ART DOCUMENTS

Patent Documents

Patent Document 1: Japanese Unexamined Patent Application Publication 2015-220743

SUMMARY OF THE INVENTION

Problem Solved by the Present Invention

The technology disclosed in Patent Document 1 relates to a video streaming system for streaming live video by switching a plurality of video captured simultaneously. On the other hand, a great deal of video content has been distributed in the past, as described above, and it is possible to produce highly interesting new video content through skillfully combining the video content that has been distributed in the past.

For example, when creating new video content through combining the data of a plurality of video content that includes video content from the past, the content creator must select that which is appropriate from a vast amount of past video content to generate video data that combines the data of a plurality of video content.

However, a vast amount of video content has been accumulated in the past, so the selection of the suitable video content by the content creator is a time-consuming and laborious operation. Moreover, while the content creator can use known content from the past to reduce the time and effort of searching for new video content, this would be unlikely to generate unexpected video content that is completely unintended by the content creator.

The present invention was created in contemplation of the situation set forth above, and the object thereof is to provide a content generating device, a content streaming server, a content generating method, and a content generating program for generating highly interesting video content.

Means for Solving the Problem

A content generating device according to a first aspect of the present invention comprises: an acquiring portion for acquiring, from an accumulating portion that has accumulated a plurality of video data, a plurality of video data that satisfy a prescribed condition; a starting frame identifying portion for specifying a starting frame wherein a prescribed action starts, for each video playback of the plurality of video data acquired by the acquiring portion; and a generating portion for generating multi-video data by combining the plurality of video data so that the timings of the specified starting frames will be synchronized.

A content streaming server according to a second aspect according to the present invention, comprises: a content generating device set forth in claim 2; a streaming portion for streaming the multi-video data generated by the content generating device; and a streaming controlling portion for controlling the streaming portion so as to stream the multi-video data to a viewer terminal.

A content generating method according to a third aspect of the present invention requests, from an accumulating portion wherein a plurality of video data are accumulated, video data that satisfy a prescribed condition, to acquire a plurality of video data satisfying the condition and identifies a starting frame wherein a prescribed action starts, for the video playback of each of the plurality of acquired video data, to generate multi-video data wherein the plurality of video data have been combined so that the identified timings of the starting frames are synchronized.

A content generating program according to a fourth aspect according to the present invention causes a computer to function as: means for requesting, from an accumulating portion wherein a plurality of video data are accumulated, video data that satisfy a prescribed condition, to acquire a plurality of video data satisfying the condition; means fix identifying a starting frame wherein a prescribed action starts, for the video playback of each of the plurality of acquired video data; and means for generating multi-video data by combining the plurality of video data so that the timings of the specified starting frames will be synchronized.

Effects of the Invention

The present invention makes it possible to provide a content generating device, a content streaming server, a content generating method, and a content generating program for generating highly interesting video content

FORMS FOR CARRYING OUT THE PRESENT INVENTION

A plurality of embodiments of the present invention will be explained in detail below, referencing the drawings. Note that in the explanation below identical reference symbols are assigned to structures and elements that are identical or similar to structures that have already been explained, and explanations thereof are omitted.

An example of a content streaming system of a first embodiment, including a content generating device and a content streaming server, will be explained below referencing the drawings.

Figure 1:
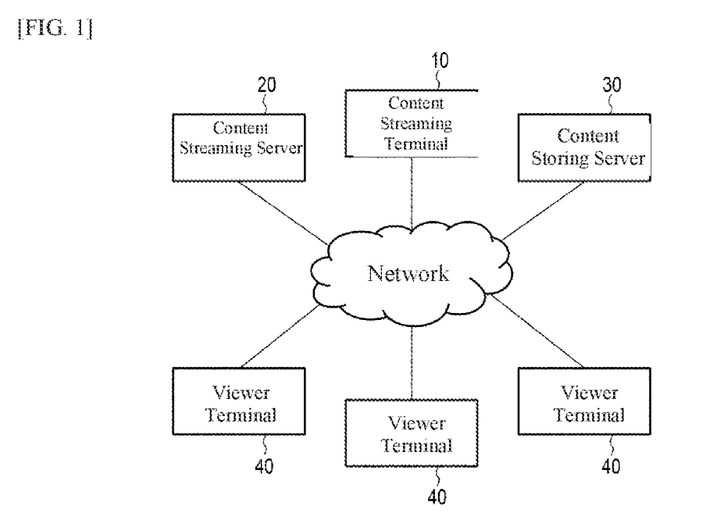
FIG. 1 is a diagram depicting schematically one structural example of a content streaming system that includes a content generating device and a content streaming server of one embodiment.

FIG. 1 is a diagram depicting schematically one structural example of a content streaming system that includes a content generating device and a content streaming server of one embodiment.

The content streaming system according to the present embodiment comprises a content streaming terminal 10, a content streaming server 20, and a content storing server (accumulating portion) 30.

The content streaming terminal 10 can be connected through a network so as to communicate with the content streaming server 20. The content streaming terminal 10 is an electronic device, which may be, for example, a television receiver (which may be for Internet television), a PC (a personal computer), a mobile terminal (such as, for example, a tablet, a smart phone, a laptop, a feature phone, a portable game machine, a digital music player, an electronic book reader, or the like), a VR (Virtual Reality) terminal, an AR (Augmented Reality) terminal, or the like, of, for example, a computer that is connected to a video source such as, for example, a video camera. The content streaming terminal 10 streams, to the content streaming server 20, encoded video data outputted from a video source.

The content streaming server 20 connect through a network to enable communication with the content streaming terminal 10, the content storing server 30, and a viewer terminal 40. The content streaming server 20 comprises a processor for executing programs to achieve the various functions described below, and a memory for storing the programs. The processor is typically a CPU (Central Processing Unit) and/or a GPU (Graphics Processing Unit), but may be a microcontroller, an FPGA (Field Programmable Gate Array), a DSP (Digital Signal Processor), or the like. Moreover, the memory stores temporarily the programs that are executed by the processor to produce the operations of the content streaming server 20, along with the data used by the processor, and the like. The content streaming server 20 according to the present embodiment may include a content generating device.

The content storing server 30 can connect through a network so as to be able to communicate with the content streaming terminal 10. The content storing server 30 may comprise, for example, a storing portion (depicted in FIG. 3) that is able to store data for a variety of content that is streamed by the content streaming server 20, a retrieving portion (depicted in FIG. 3) for retrieving, from the plurality of content data that are stored in the storing portion, those that satisfy specific conditions, a processor for executing programs for achieving a variety of functions, and a memory for storing the programs.

The processor is typically a CPU (Central Processing Unit) and/or a GPU (Graphics Processing Unit), but may be a microcontroller, an FPGA (Field Programmable Gate Array), a DSP (Digital Signal Processor), or the like. Moreover, the memory stores temporarily the programs that are executed by the processor to produce the operations of the content storing server 30, along with the data used by the processor, and the like. The content data stored in the storing portion of the content storing server 30 is not limited to content data that is to be streamed by the content streaming server 20, but rather distributed content data that has been edited, and content data prior to streaming, may be stored as well.

Note that the content streaming server 20 and the content storing server 30 may be structured as a single unit, and the content streaming server 20 and the content storing server 30 may be connected together directly, without going through the network.

The viewer terminal 40 may be connected through a network to enable communication with the content streaming server 20. Note that the viewer terminal 40 is an electronic device such as a computer, or the like, which may be, for example, a television receiver (which may be for Internet television), a PC (a personal computer), a mobile terminal (such as, for example, a tablet, a smart phone, a laptop, a feature phone, a portable game machine, a digital music player, an electronic book reader, or the like), a VR (Virtual Reality) terminal, an AR (Augmented Reality) terminal, or the like. Note that the number of viewer terminals 40 connected to the network may be zero, and may be increased or decreased at any time.

Figure 2:
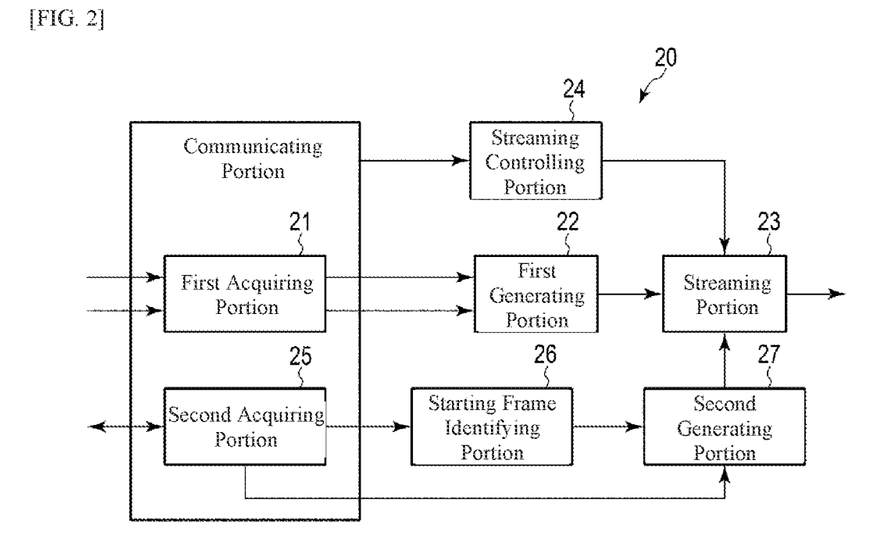
FIG. 2 is a diagram depicting schematically one structural example the content streaming server depicted in FIG. 1.

FIG. 2 is a diagram depicting schematically one structural example the content streaming server depicted in FIG. 1.

The content streaming server 20 comprises a first acquiring portion 21, a second acquiring portion 25, a first generating portion 22, a streaming portion 23, a streaming controlling portion 24, a starting frame identifying portion 26, and a second generating portion 27. Note that the content generating device in the present embodiment includes the second acquiring portion 25, the starting frame identifying portion 26, and the second generating portion 27, and may be structured as a single unit with the content streaming server 20, or may be structured outside of the content streaming server 20 and connected so as to enable communication with the content streaming server 20.

Additionally, the content streaming server 20 may further comprise a communicating portion that is able to communicate with a network, and a data storing portion (not shown) that is able to store large amounts of data.

The data storing portion may be built into the content streaming server 20 or may be attached to the content streaming server 20 externally. The data storing portion may include a non-volatile storage medium such as an HDD (Hard Disk Drive), an SSD (Solid State Drive), or the like. Note that the data storing portion may include an accumulating portion for accumulating those data, from among a plurality of video content that has been distributed in the past, that satisfy prescribed conditions. The data storing portion may be shared by the content streaming server 20 and the content generating device, or respective data storing portions may be provided for the content streaming server 20 and the content generating device.

The communicating portion at is able to communicate with the content streaming terminal 10, the content storing server 30, and the viewer terminals 40 through a network, and may include a first acquiring portion 21 and a second acquiring portion 25. For example, the communicating portion receives video data from the content streaming terminal 10, sends, to the content storing server 30, requests for content data, receives content data from the content storing server 30, and receives streaming requests from the viewer terminals 40. The communicating portion sends, to the streaming controlling portion 24, streaming requests received from viewer terminals 40.

The first acquiring portion 21 is able to receive content data that is streamed through the network from the content streaming terminal 10. For example, the first acquiring portion 21 receives video data for real-time streaming from the content streaming terminal 10. Additionally, the first acquiring portion 21 is able to receive inputted information, such as comments, or the like, that are sent sequentially through the network from viewer terminals 40. The first acquiring portion 21 sends, to the first generating portion 22, the video data that has been received.

The second acquiring portion 25 not only requests, from the content storing server 30 through the network, a plurality of video content data that satisfy the prescribed conditions, but also receives the video content data from the content storing server 30. The second acquiring portion 25 sends, to the starting frame identifying portion 26 and the second generating portion 27, the plurality of video content data that have been received.

Note that if video content data that is stored in the data storing portion of the content streaming server 20 satisfies prescribed conditions, the second acquiring portion 25 may acquire the video content data that is stored in the data storing portion and send it to the starting frame identifying portion 26 and second generating portion 27.

For example, the second acquiring portion 25 may request periodically, from the content storing server 30, data for video content that satisfies prescribed conditions, and in response to a request from the content streaming terminal 10 or a viewer terminal 40 may request, from the content storing server 30, data of video content that satisfies prescribed conditions.

The conditions satisfied by the video content requested by the second acquiring portion 25 from the content storing server 30 may be conditions that have been set in advance, and, for example, may be conditions inputted using inputting means (not shown) of the content streaming server, or may be conditions requested from the content streaming terminal 10 or a viewer terminal 40. Moreover, the second acquiring portion 25 is able to request, from the content storing server 30, video content that satisfies at least one of a plurality of conditions that have been set in advance or inputted.

The conditions for the video content, set in advance or inputted into the second acquiring portion 25, may include a genre, the person that streamed the video, tag information, the date when the video was streamed, number of comments, number of viewers when streamed, or the like, and may include data for video content that is set or inputted in advance, or may be set in association with data for the video content, such as the genre, the person who streamed the video, tag information, the date when the video was streamed, number of comments, number of viewers when streamed, or the like.

The second acquiring portion 25, depending on the conditions that have been set, can, for example, acquire a plurality of videos wherein identical music is being performed, can acquire a plurality of live feeds of horse races or bicycle races, can acquire a plurality of videos of competitive sports such as marathons, swimming, or the like, can acquire a plurality of dance videos that are all set to the same song, acquire a plurality of videos that show screens of the same game, acquire a plurality of videos that show the state of play on a gaming machine, or the like.

The streaming controlling portion 24 controls streaming of the video data. The streaming controlling portion 24 includes, for example, a clock, not shown, and compares time information received from the clock to the time frame assigned for streaming of the video data, to control when the streaming of the video data is to start and stop. Additionally, the streaming controlling portion 24 receives, from the communicating portion, streaming requests from the viewer terminals 40, and controls the streaming portion 23 so that the video data will be streamed to the viewer terminals 40.

The first generating portion 22 can receive inputted information and video data from the first acquiring portion 21, and can superimpose that inputted information onto the video data to generate video data for streaming. The first generating portion 22 may use a known method such as alpha blending, picture-in-picture, or the like, to combine the inputted information with the video data. The first generating portion 22 sends, to the streaming portion 23, the video data for streaming that has been generated.

The first generating portion 22 may, for example, resize some or all of the screens for playing back the video data, or may trim a portion of the screens and combine with the inputted information, or may expose a portion of the screens for playing back the video data, and may combine the inputted information so that the remaining portion thereof remains hidden. Moreover, to enable streaming by switching between a plurality of video data for streaming depending on streaming requests from viewer terminals 40, the first generating portion 22 may generate a plurality of video data for streaming with different video displayed, and may send these video data to the streaming portion 23. The first generating portion 22 may generate, and send to the streaming portion 23, video data for streaming that is generated by superimposing video data for streaming that is generated without superimposing inputted information on the video data, and video data wherein inputted information is superimposed on the video data.

The starting frame identifying portion 26 receives a plurality of video data from the second acquiring portion 25. For each of the plurality of video data that have been received, the starting frame identifying portion 26 identifies the framework in the video playback wherein a prescribed action starts (the starting frame). Here an operation such as performing, singing, dancing, or the like, for prescribed music, a race such as a horse race or bicycle race, sports such as a marathon, swimming, or the like, a game such as an RPG, an action game, a battle game, or the like, operation of a gaming machine such as a slot machine or a pachinko machine, and so forth, for example, may be used for the prescribed action.

The starting frame identifying portion 26 may identify, as the starting frames, the position of the flags if flags that indicate the frames with the timings with which the prescribed actions start are included in the plurality of video data received from the second acquiring portion 25.

Moreover, the starting frame identifying portion 26 may identify prescribed actions depending on conditions satisfied by the plurality of video data received from the second acquiring portion 25, to identify the starting frames of the prescribed actions.

Additionally, the starting frame identifying portion 26 may identify the starting frame through comparing to each other the plurality of video data received from the second acquiring portion 25. For example, the starting frame identifying portion 26 is able to identify the starting frames, in the video playback of a plurality of video data, through the timings with which identical tunes are started, identical sounds that occur with the timing of the start of the action, or the like. Moreover, the starting frame identifying portion 26 can, for example, identify the starting frames through identical changes in the video, such as the timings with which hues of prescribed parts change, timings with which brightnesses of prescribed parts change, or the like, in the video playback of the plurality of video data.

The starting frame identifying portion 26 may also comprise a trained model for specifying the starting frames of the inputted video data. The trained model is a model that has been trained, through deep learning such as a convolution neural network (CNN), to identify the frames corresponding to the timings with which prescribed actions start in the video playback of the video data when video data satisfying prescribed conditions have been inputted, or the like. When a plurality of conditions for retrieving video data are envisioned, the starting frame identifying portion 26 may comprise a plurality of trained models corresponding to each of the plurality of conditions.

The starting frame identifying portion 26 sends, to the second generating portion 27, information indicating the specified starting times for each of the plurality of video data. The starting frame identifying portion 26 may send, to the second generating portion 27, the plurality of video data after applying, to the respective video data, flags that indicate the starting frames that have been identified. In this case, the transmission of the plurality of video data from the second acquiring portion 25 to the second generating portion 27 may be omitted.

The second generating portion 27 receives the plurality of video data from the second acquiring portion 25 and receives, from the starting frame identifying portion 26, information indicating the starting frames. The second generating portion 27 generates multi-video data wherein the video playback of the plurality of video data that have been received is edited by structuring to be displayed arranged on a screen, and so as to synchronize the timings of the starting frames. Note that the second generating portion 27 and the various other structures referenced thus far may be structured so that, in the case of a live feed of a horse race wherein the timing of the start of the race might be used as the starting frame, rather than compositing by selecting only the portion from the start of the race up until the finish for the video data that is to be composited, instead one may, for example, start several dozen seconds prior to the start of the race, to thereby convey the feeling of anticipation and excitement prior to the race and expectations regarding the race results, and may have several dozen seconds after arriving at the finish line be subject to compositing, so as to include videos looking back at the race, or showing the various horses cooling down after the race. This is not limited to horse races, but would be the same in videos in other fields, There is no particular limitation that the video playback starting frame and playback ending frame be the timing of the starting or the timing of the ending of the action, insofar as the timings of the starting frames of the plurality of videos are synchronized.

The second generating portion 27 may use a known method such as, for example, alpha blending, picture-in-picture, or the like, to combine a plurality of video data. The second generating portion 27 sends the generated multi-video data to the streaming portion 23. Note that in video playback of the multi-video data, there is no need for the sizes to be identical for each of the plurality of videos that are played back. The second generating portion 27 sends the generated multi-video data to the streaming portion 23.

The streaming portion 23 can connect to a network so as to enable communication, receive, from the first generating portion 22, video data for streaming, receive multi-video data from the second generating portion 27, and distribute the respective video data and multimedia data for streaming, to the viewer terminal 40 from which the streaming requests were received. In the streaming portion 23, the streaming destinations for the video data for streaming, and the like, are controlled by the streaming controlling portion 24.

Note that the streaming portion 23 may immediately discard video data and multi-video data for streaming for which streaming has been completed, but, conversely, these may be buffered for a prescribed time interval in order to enable replay and viewing in slow motion.

Moreover, the streaming portion 23 sends, to the content storing server 30, the video data and multi-video data for streaming that has been streamed. In this case, the streaming portion 23 can receive, from the streaming controlling portion 24, in correspondence with the respective video data and multi-video data for streaming, inputted information (the number of comments, or the like), numbers of viewer terminals 40 that have requested viewing, information for identifying the video data and multi-video data for streaming (tag information, streamer information, the date when the video was streamed, genre, and the like), and so forth, in relation to the video data and multi-video data for streaming, and send the video data and multi-video data for streaming to the content storing server 30 together with the information that has been received.

Figure 3:
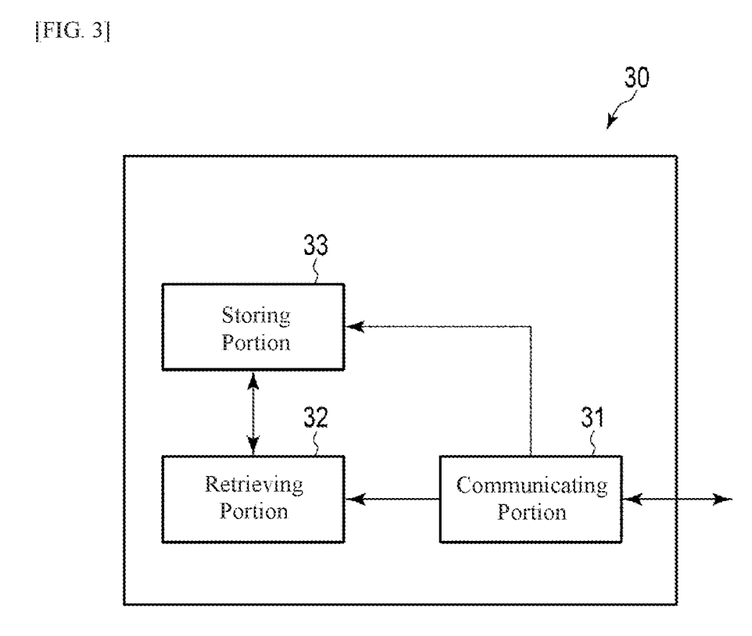
FIG. 3 is a diagram depicting schematically one structural example of the content of storing server depicted in FIG. 1.

FIG. 3 is a diagram depicting schematically one structural example of the content storing server depicted in FIG. 1.

The content storing server 30 comprises a communicating portion 31, a retrieving portion 32, and a storing portion 33.

The communicating portion 31 may be connected to the content streaming server 20 through a network so as to enable communication. The communicating portion 31 receives, from the content streaming server 20, the video data and multi-video data for streaming, and sends it to the storing portion 33. When the communicating portion 31 has received inputted information (the number of comments, or the like), numbers of viewer terminals 40 that have requested viewing, information for identifying the video data and multi-video data for streaming (tag information, streamer information, the date when the video was streamed, genre, and the like), and so forth, in relation to the video data and multi-video data for streaming, it can send, to the storing portion 33, the received streaming control information that corresponds to the respective video data and multi-video data for streaming.

The communicating portion 31 receives content retrieval conditions from the content streaming server 20, sends them to the retrieving portion 32, and sends, to the content streaming server 20, the retrieval results (a plurality of video data) that have been received from the retrieving portion 32.

Content data (including video data and multi-video data for streaming), inputted information (number of comments, etc.) regarding the data, number of times the content has been viewed, and other information for identifying the content (tag information, streamer information, timing of streaming, genre, and the like, and so forth), for example, are stored, in relation to each other, in the storing portion 33.

The retrieving portion 32 receives retrieval conditions from the communicating portion 31 and reads out a plurality of content data, from the content data accumulated in the storing portion 33, that satisfy the retrieval conditions, and sends them to the communicating portion 31. The retrieving portion 32 may comprise, for example, video analyzing means. Lf, for example, video data is included as the retrieval conditions received from the communicating portion 31, the retrieving portion 32 can retrieve a plurality of similar video data from the plurality of content data accumulated in the storing portion 33, using, as a retrieval condition, the result of analysis of video data received from the video analyzing means.

A plurality of examples of operation of the content streaming system, described above, will be explained below in reference to the drawings.

Figure 4:
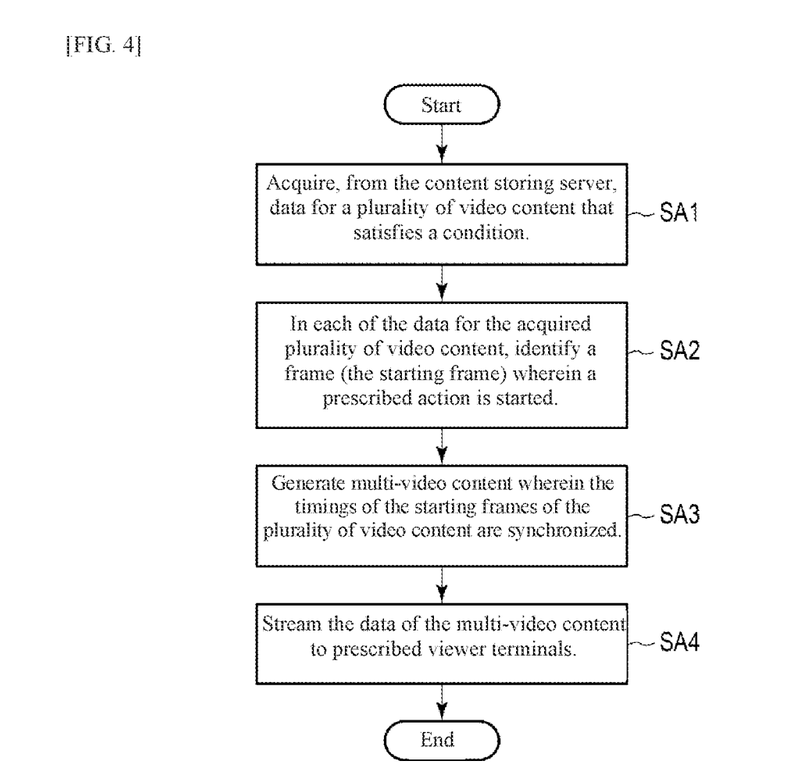
FIG. 4 is a flowchart for explaining an example of operation of the content streaming server in one embodiment.

FIG. 4 is a flowchart for explaining an example of operation of the content streaming server in one embodiment.

Figure 5:
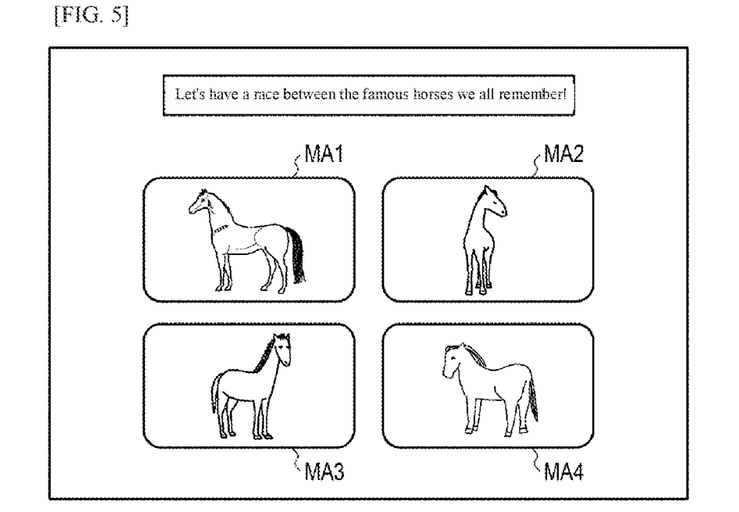
FIG. 5 is a diagram depicting schematically an example of video playback of multi-video data streamed by the content streaming server of one embodiment.

FIG. 5 is a diagram depicting schematically an example of video playback of multi-video data streamed by the content streaming server of one embodiment.

The operation of a content streaming server 20 when generating multi-video data using a plurality of video data wherein a horse race is live fed will be explained here in reference to FIG. 4 and FIG. 5.

First the second acquiring portion 25 of the content streaming server 20 requests, from the content storing server 30, data for a plurality of video content that satisfy the prescribed conditions, and receives the plurality of video data from the content storing server 30 (Step SA1).

In this case, the second acquiring portion 25 sends, for example, tag information for identifying the content of the live-fed horse race, streamer information for the streamer that streamed the live-fed horse race in the past, the names of the racehorses and the names of the jockeys, the name of the horse race track, the date of the race, the name of the race, the video data from when a horse race was life-fed in the past, the number of video data requested and the like, as retrieval conditions, to the content storing server 30.

The second acquiring portion 25 sends, to the starting frame identifying portion 26 and the second generating portion 27, video data for a plurality of horse race live feeds, received from the content storing server 30.

The starting frame identifying portion 26 identifies, as the starting frames for each of the plurality of horse race live feed data received from the second acquiring portion 25, the frames corresponding to the timings with which the racehorses start. The starting frame identifying portion 26 may identify the starting frames by identifying, in the videos, the timings with which the starting gates are opened, or may identify the starting frames by identifying the sounds of the gates opening if information for the sounds was added to the video when the gates opened (Step SA2).

The starting frame identifying portion 26 defines associations between the video data identifying information and the starting frame information for each of the plurality of video data, and sends them to the second generating portion 27.

The second generating portion 27 receives, from the second acquiring portion 25, the plurality of horse race live feed data and receives the starting frame information associated with the video data identifying information from the starting frame specifying portion 26, to generate content through multi-video data that combines video data from a plurality of horse race live feeds so that the timings of the starting frames will be synchronized (Step SA3). The second generating portion 27 sends the generated multi-video data to the streaming portion 23.

The streaming portion 23 streams, to the viewer terminals 40 from which the streaming requests have been received, the multi-video data that have been received (Step SA4).

In FIG. 5, an example of a playback screen for multi-video data wherein four horse race live feeds MA1 through MA4 have been combined is depicted schematically. In this case, it is possible to generate content as if the racehorses that appear in the horse race live feeds MA1 through MA4 are competing against each other, through generating multi-video data wherein the timings with which the horse races are started are synchronized, despite, for example, the horse race live feeds MA1 through MA4 being videos that are live feeds of different horse races.

Consequently, it is possible to generate content as if famous horses were racing against each other, through compiling the videos MA1 through MA4 that are live feeds of races of famous horses in the past. In addition, it is possible to generate content comparing races of specific racehorses by compiling a plurality of videos MA1 through MA4 that are live feeds of different races wherein specific racehorses appear.

Note that while FIG. 5 shows an example wherein the plurality of videos MA1 through MA4 are arranged lined up in a state wherein they do not overlap, the plurality of videos MA1 through MA4 may be arranged instead so that they are at least partially overlapping, or the arrangement may be such that at least one of the videos MA1 through MA4 is caused to be transparent and to overlap another video.

Figure 6:
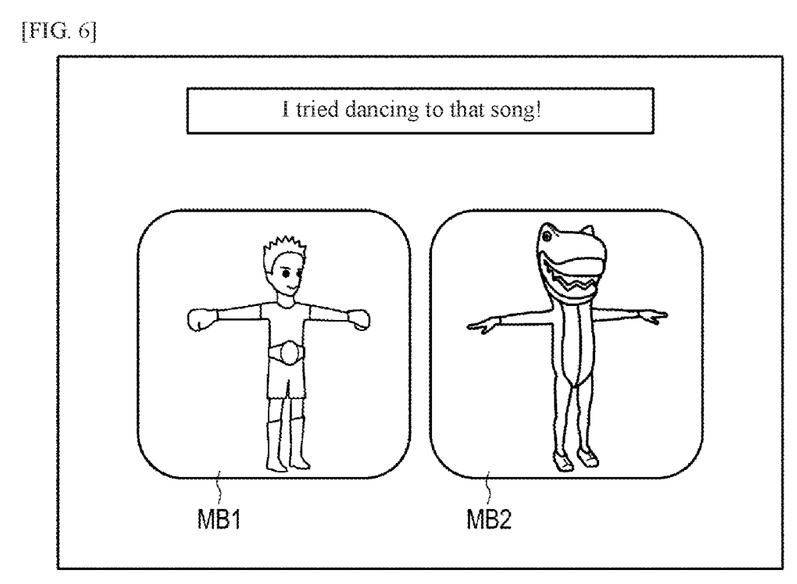
FIG. 6 is a diagram depicting schematically an example of video playback of multi-video data streamed by a content streaming server of one embodiment.

FIG. 6 is a diagram depicting schematically an example of video playback of multi-video data streamed by the content streaming server of one embodiment. Here the operation of the content streaming server 20 when multi-video data is generated using a plurality of video data that display individuals dancing, or the states of avatars, set to the same music will be explained in reference to FIG. 4 through FIG. 6.

First the second acquiring portion 25 of the content streaming server 20 requests, from the content storing server 30, data for a plurality of video content that satisfy the prescribed conditions, and receives the plurality of video data from the content storing server 30 (Step SA1).

In this case, the second acquiring portion 25 sends, to the content storing server 30 as retrieval conditions, tag information for identifying the content of the dance video, for example, information on the streamers that streamed the dance video content in the past, song titles, dance genres, dancer names, dancer sex, streaming dates, dance video data from the past, number of video data requested, and the like. The second acquiring portion 25 sends, to the starting frame identifying portion 26 and the second generating portion 27, the plurality of dance video data received from the content storing server 30.

The starting frame identifying portion 26 identifies, as the starting frames, frames corresponding to the timings with which the dancing starts in each of the plurality of dance video data received from the second acquiring portion of 25. The starting frame identifying portion 26 may identify the starting frames by identifying, for example, through the video, the timings with which the tunes or songs start, or may identify the starting frames by identifying the timings with Which dancers begin to move (Step SA2).

The starting frame identifying portion 26 defines associations between the video data identifying information and the starting frame information for each of the plurality of video data, and sends them to the second generating portion 27.

The second generating portion 27 receives the plurality of dance video data from the second acquiring portion 25, receives the information for the starting frames, associated with the video data identifying information, from the starting frame identifying portion 26, and generates content through multi-video data wherein a plurality of dance video data are combined together so that the timings of the starting frames are synchronized (Step SA3). The second generating portion 27 sends the generated multi-video data to the streaming portion 23.

Note that if, for example, the tempos of the tunes (beats per time) in a dance video MB1 and a dance video MB2 are different, the second generating portion 27 may adjust the playback speed of one video to match the tempo of the tune in the other video, or may adjust the playback speeds of all of the videos so that the tempos in the tunes of all of the videos will be at a prescribed speed.

The streaming portion 23 streams, to the viewer terminals 40 from which the streaming requests have been received, the multi-video data that have been received (Step SA4).

An example of a playback screen for multi-video data wherein two dance videos MB1 and MB2 have been combined is depicted schematically in FIG. 6. In this example, a dance video MB1 that serves as a model and a dance video MB2 of a person practicing the dance can be arranged lined up together, to generate multi-video data wherein the timings with which the dances are started are synchronized, to generate content wherein the dancing of the model and the dancing of the person practicing can be compared. Additionally, content that appears as if a plurality of dancers are dancing together can be generated through displaying videos of different dancers together. Consequently, it is possible to compile dance videos MB1 through MB2 by famous dancers to generate content as if the dancers are performing together.

Note that while FIG. 6 shows an example wherein the plurality of videos MB1 through MB2 are arranged lined up in a state wherein they do not overlap, the plurality of videos MB1 through MB2 may be arranged instead so that they are at least partially overlapping, or the arrangement may be such that at least one of the videos MB1 through MB2 is caused to be transparent and to overlap another video.

Moreover, there is no limitation to the multi-video data wherein the starting frames wherein the tunes are started are synchronized being combinations of a plurality of dance videos, but rather it is possible, for example, to combine a plurality of videos showing players playing along with music that is being performed. For example, content that appears as if a band is performing or an orchestra is performing can be generated through playing back multi-video data that combines a plurality of videos that show the states of performances on a plurality of different musical instruments.

Figure 7:
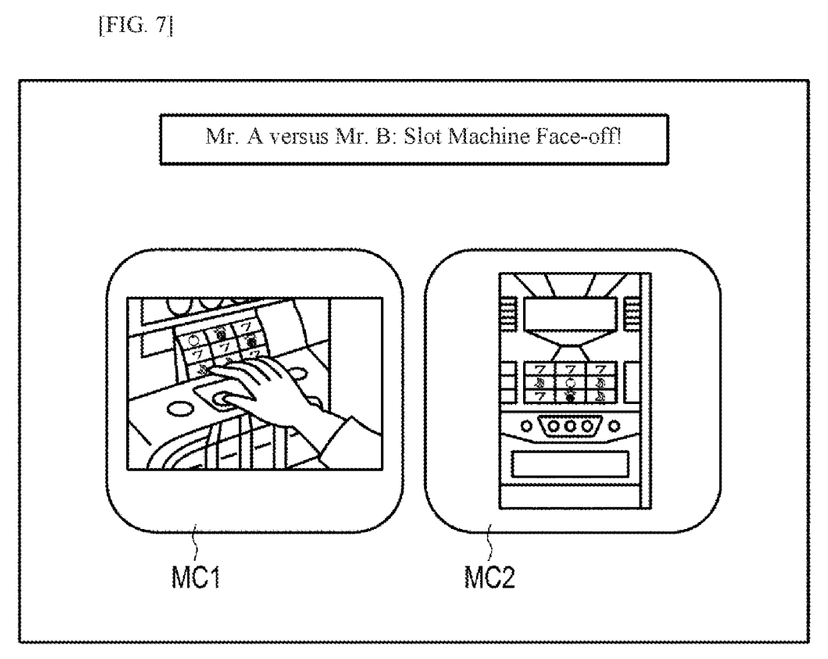
FIG. 7 is a diagram depicting schematically an example video playback of multi-video data streamed by a content streaming server of one embodiment.

FIG. 7 is a diagram depicting schematically an example of video playback of multi-video data streamed by the content streaming server of one embodiment. The operation of the content streaming server 20 when generating multimedia data using a plurality of video data that displays the state when gaming on a gaming machine will be explained here in reference to FIG. 4 and FIG. 7.

First the second acquiring portion 25 of the content streaming server 20 requests, from the content storing server 30, data for a plurality of video content that satisfy the prescribed conditions, and receives the plurality of video data from the content storing server 30 (Step SA1).

In this case, the second acquiring portion 25 sends, to the content storing server 30 as retrieval conditions, tag information for identifying the content of the gaming video of the gaming machine, information on the person that streamed the gaming video content for the gaming machine in the past, the type of gaming machine, the name of the player, the date of streaming, gaming video for the gaming machine in the past, the number of video data requested, and the like, for example. The second acquiring portion 25 sends, to the starting frame identifying portion 26 and the second generating portion 27, the plurality of gaming video data for the gaming machine, received from the content storing server 30.

The starting frame identifying portion 26 identifies, as the starting frames, frames corresponding to the timings with Which the gaming starts in each of the plurality of gaming video data for the gaming machine, received from the second acquiring portion of 25. The starting frame identifying portion 26 may identify the starting frames by, for example, identifying sounds that are emitted from the gaming machines when the gaming starts, may identify the starting frames by identifying, through the video, lighting in the gaming machines that lights up when gaming starts, or may identify the starting frames by identifying operations by the players (Step SA2).

The starting frame identifying portion 26 defines associations between the video data identifying information and the starting frame information for each of the plurality of video data, and sends them to the second generating portion 27.

The second generating portion 27 receives the plurality of gaming video data for the gaming machine from the second acquiring portion 25, receives the information for the starting frames, associated with the video data identifying information, from the starting frame identifying portion 26, and generates content through multi-video data Wherein a plurality of dance video data are combined together so that the timings of the starting frames are synchronized (Step SA3). The second generating portion 27 sends the generated multi-video data to the streaming portion 23.

The streaming portion 23 streams, to the viewer terminals 40 from which the streaming requests have been received, the multi-video data that have been received (Step SA4).

An example of a playback screen for multi-video data wherein two gaming videos MC1 and MC2 have been combined is depicted schematically in FIG. 7. In this example, the videos MC1 and MC2, wherein different individuals are gaming at totally different times, for example, are arranged lined up and multi-video data is generated so that the timings with which the gaming is started are synchronized, to generate content that appears as if a plurality of players are competing in the game. Consequently, it is possible to compile gaming videos MC1 through MC2 by famous garners to generate content as if the garners are competing against each other.

Note that while FIG. 7 shows an example wherein the plurality of videos MC1 through MC2 are arranged lined up in a state wherein they do not overlap, the plurality of videos MC1 through MC2 may be arranged instead so that they are at least partially overlapping, or the arrangement may be such that at least one of the videos MC1 through MC2 is caused to be transparent and to overlap another video.

Given the present embodiment, as described above, the content streaming server 20 can acquire a plurality of video data satisfying prescribed conditions, to generate automatically content using multi-video data wherein the plurality of video data is combined so that the timings with which prescribed actions are started will be synchronized. This can reduce the time and effort required for selecting that which is appropriate from a vast amount of content from the past, and for carrying out editing operations to incorporate the past video content into new video content, when, for example, creating new video content by combining a plurality of video content that includes video content from the past.

Moreover, because video data used in generating the multi-video data is extracted automatically from the data that satisfy prescribed conditions, it is possible that a plurality of video data will be extracted in combinations not intended or expected by the content creator or viewers, making it possible to generate highly interesting video content.

In the present embodiment, when a plurality of video data regarding an arbitrary tune, for example, is extracted, video data wherein that tune is sung, video data wherein the tune is performed by a wind ensemble or an orchestra, video data wherein a dance is performed to the tune, video data from a sports meet wherein the tune is performed in the background, or a variety of video data wherein the tune is used as background music, or the like, may be extracted.

That is, in the present embodiment that which satisfies prescribed conditions is extracted from a plurality of various video content that has been distributed in the past, so that rather than merely combining a plurality of karaoke video data for simply singing along with the tune, it is possible to generate more unexpected, highly interesting multi-video content.

Conventionally, when, for example, generating unexpected multimedia content as described above, it has been necessary for the content creator to extract video data by sequentially seeking out a plurality of video content that is narrowed down by relying on information for tags, streamers, and the like, from the vast amount of video content that has been distributed in the past across a plurality of categories. This operation has required a vast amount of time and effort, so the candidate video content would be narrowed down based on information that is known by the streamer, making it unlikely to find unexpected combinations of video content. In contrast, with the content streaming server according to the present invention, the content creator can generate unexpected and highly interesting content, as described above, without requiring the time and effort for extracting video data from among a vast amount of video content, and the generated content can be distributed to the viewers.

That is, the present embodiment enables provision of a content generating device, content streaming server, content generating method, and content generating program for generating highly interesting video content.

Figure 8:
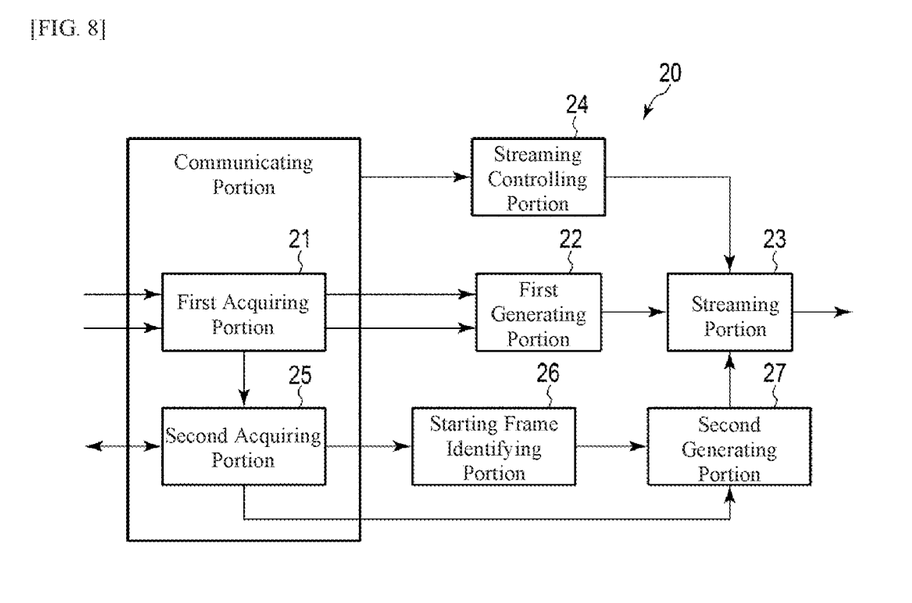
FIG. 8 is a diagram depicting schematically another structural example of the content streaming server depicted in FIG. 1.

An example of a content streaming system that includes a content streaming server of a second embodiment will be explained below, referencing the drawings. FIG. 8 is a diagram depicting schematically another structural example of the content streaming server depicted in FIG. 1.

The content streaming server 20 comprises a first acquiring portion 21, a second acquiring portion 25, a first generating portion 22, a streaming portion 23, a streaming controlling portion 24, a starting frame identifying portion 26, and a second generating portion 27. In the content streaming server 20 according to the present embodiment, the structures of the first acquiring portion 21, the second acquiring portion 25, the starting frame identifying portion 26, and the second generating portion 27 are different from those in the first embodiment, described above. The explanation below will focus on the structures that are different from those in the first embodiment, and redundant explanations will be omitted.

The content generating device in the present embodiment includes the second acquiring portion 25, the starting frame identifying portion 26, and the second generating portion 27, and may be structured as a single unit with the content streaming server 20, or may be structured outside of the content streaming server 20 and connected so as to enable communication with the content streaming server 20.

The first acquiring portion 21 is able to receive content data that is streamed through the network from the content streaming terminal 10. For example, the first acquiring portion 21 receives video data for real-time streaming from the content streaming terminal 10. Additionally, the first acquiring portion 21 is able to receive inputted information, such as comments, or the like, that are sent sequentially through the network from viewer terminals 40. The first acquiring portion 21 sends, to the first generating portion 22 and to the second acquiring portion 25, the video data that has been received.

Note that the first acquiring portion 21 may send all of the received video data to the second acquiring portion 25, or, for example, it may send to the second acquiring portion 25 only the video data that has tag information that has been set in advance, or may send to the second acquiring portion 25 only the video data with a streamer that is set in advance, or may send to the second acquiring portion 25 only video data of a streamer that is participating in a prescribed event that is held, for example, online. As to whether or not the distributor is participating in an event, this can be included as tag information that is attached to the video data, or the distributor that participates in the event may register in advance.

The second acquiring portion 25 can receive video data from the first acquiring portion 21, and send to the content storing server 30 as retrieval conditions, for example, tag information and video data that has been received. The second acquiring portion 25 not only requests, from the content storing server 30 through the network, at least one video content data that satisfy the prescribed conditions, but also receives the at least one video content data from the content storing server 30. The second acquiring portion 25 sends, to the starting frame identifying portion 26 and the second generating portion 27, the video data (first video data) received from the first acquiring portion 21 and the data for the at least one video content (second video data) received from the content storing server 30. In this case, the second acquiring portion 25 can assign respective information (flags, or the like) for enabling the first video data and the second video data to be identified, and send it to the starting frame identifying portion 26 and the second generating portion 27.

Note that when, in the data for the video content that is stored in the data storing portion of the content streaming server 20 there is that which satisfies the prescribed conditions, the second acquiring portion 25 may acquire data for the video content that is stored in the data storing portion and may send it to the starting frame identifying portion 26 and the second generating portion 27 together with the video data received from the first acquiring portion 21.

The second acquiring portion 25, in response to the video data received from the first acquiring portion 21, can acquire, for example, a plurality of videos wherein the same music is performed, may acquire a plurality of live feeds of horse races or bicycle races, may acquire a plurality of videos of competitive sports such as marathons, swimming, or the like, may acquire a plurality of dance videos set to the same tunes, may acquire a plurality of videos showing screens of the same games, and/or may acquire a plurality of videos showing the state of gaming on a gaming machine.

The starting frame identifying portion 26 receives a plurality of video data from the second acquiring portion 25. For each of the plurality of video data that have been received, the starting frame identifying portion 26 identifies the framework in the video playback wherein a prescribed action starts (the starting frame). Here an operation such as performing, singing, dancing, or the like, for prescribed music, a race such as a horse race or bicycle race, sports such as a marathon, swimming, or the like, a game such as an RPG, an action game, a battle game, or the like, operation of a gaming machine such as a slot machine or a pachinko machine, and so forth, for example, may be used for the prescribed action.

The starting frame identifying portion 26 may identify, as the starting frames, the position of the flags if flags that indicate the frames with the timings with which the prescribed actions start are included in the plurality of video data received from the second acquiring portion 25.

Moreover, the starting frame identifying portion 26 may identify prescribed actions depending on conditions satisfied by the plurality of video data received from the second acquiring portion 25, to identify the starting frames of the prescribed actions.

Additionally, the starting frame identifying portion 26 may identify the starting frame through comparing to each other the plurality of video data received from the second acquiring portion 25. For example, the starting frame identifying portion 26 is able to identify the starting frames, in the video playback of a plurality of video data, through the timings with which identical tunes are started, identical sounds that occur with the timing of the start of the action, or the like. Moreover, the starting frame identifying portion 26 can, for example, identify the starting frames through identical changes in the video, such as the timings with which hues of prescribed parts change, timings with which brightnesses of prescribed parts change, or the like, in the video playback of the plurality of video data.

The starting frame identifying portion 26 may also comprise a trained model for specifying the starting frames of the inputted video data. The trained model is a model that has been trained, through deep learning such as a convolution neural network (CNN), to identify the frames corresponding to the timings with which prescribed actions start in the video playback of the video data when video data satisfying prescribed conditions have been inputted, or the like. When a plurality of conditions for retrieving video data are envisioned, the starting frame identifying portion 26 may comprise a plurality of trained models corresponding to each of the plurality of conditions.

The starting frame identifying portion 26 sends, to the second generating portion 27, information indicating the specified starting times for each of the plurality of video data. The starting frame identifying portion 26 may send, to the second generating portion 27, the plurality of video data after applying, to the respective video data, flags that indicate the starting frames that have been identified. In this case, the transmission of the plurality of video data from the second acquiring portion 25 to the second generating portion 27 may be omitted.

The second generating portion 27 receives the plurality of video data from the second acquiring portion 25 and receives, from the starting frame identifying portion 26, information indicating the starting frames. The second generating portion 27 generates multi-video data wherein the video playback of the plurality of video data that have been received is edited by structuring to be displayed arranged on a screen, and so as to synchronize the timings of the starting frames.

The second generating portion 27 may use a known method such as, for example, alpha blending, picture-in-picture, or the like, to combine a plurality of video data. The second generating portion 27 sends the generated multi-video data to the streaming portion 23. Note that in video playback of the multi-video data, there is no need for the sizes to be identical for each of the plurality of videos that are played back. The second generating portion 27 sends the generated multi-video data to the streaming portion 23.

The streaming portion 23 can connect to a network so as to enable communication, receive, from the first generating portion 22, video data for streaming, receive multi-video data from the second generating portion 27, and distribute the respective video data and multimedia data for streaming, to the viewer terminal 40 from which the streaming requests were received. In the streaming portion 23, the streaming destinations for the video data for streaming, and the like, are controlled by the streaming controlling portion 24.

Note that the streaming portion 23 may immediately discard video data and multi-video data for streaming for which streaming has been completed, but, conversely, these may be buffered for a prescribed time interval in order to enable replay and viewing in slow motion.

Moreover, the streaming portion 23 sends, to the content storing server 30, the video data and multi-video data for streaming that has been streamed. In this case, the streaming portion 23 can receive, from the first generating portion 22 and the second generating portion 27, in correspondence with the respective video data and multi-video data for streaming, inputted information (the number of comments, or the like), numbers of viewer terminals 40 that have requested viewing, information for identifying the video data and multi-video data for streaming (tag information, streamer information, the date when the video was streamed, genre, and the like), and so forth, in relation to the video data and multi-video data for streaming, and send the video data and multi-video data for streaming to the content storing server 30 together with the information that has been received.

Figure 9:
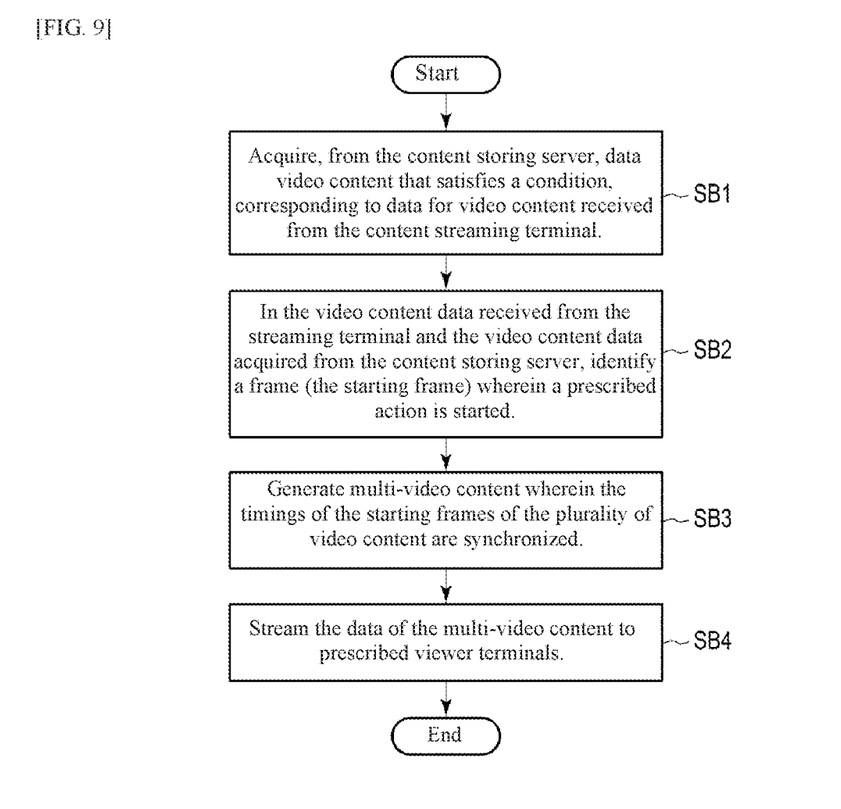
FIG. 9 is a flowchart for explaining an example operation of a content streaming server of one embodiment.

FIG. 9 is a flowchart for explaining an example of operation of the content streaming server in one embodiment.

Figure 10:
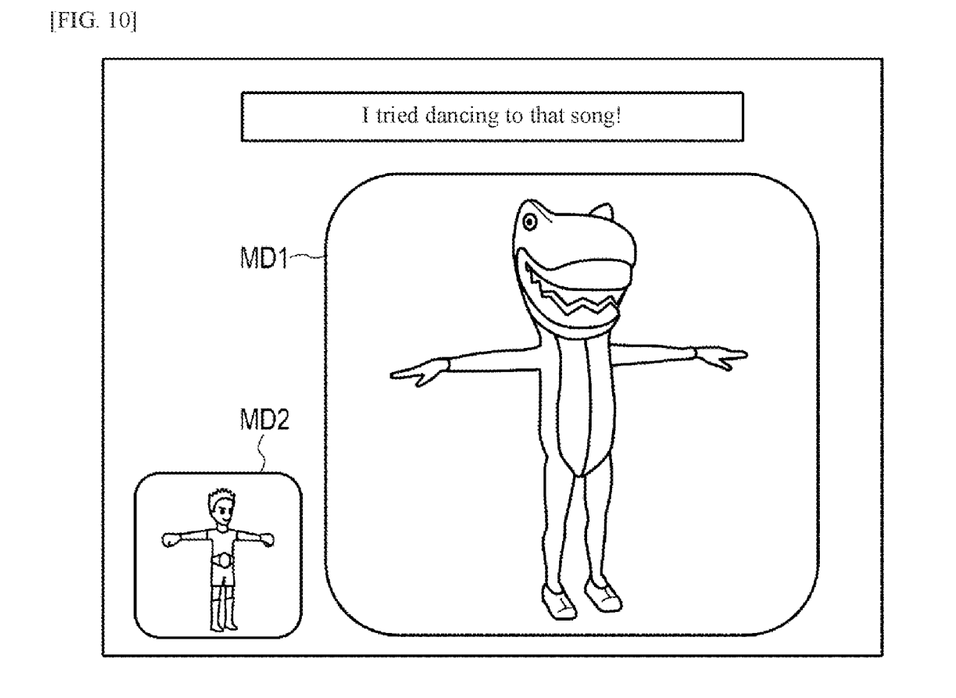
FIG. 10 is a diagram depicting schematically an example of video playback of multi-video data streamed by a content streaming server of one embodiment.

FIG. 10 is a diagram depicting schematically an example of video playback of multi-video data streamed by the content streaming server of one embodiment. Here the operation of the content streaming server 20 when multi-video data is generated using a plurality of video data that display individuals dancing, or the states of avatars, set to the same music will be explained in reference to FIG. 9 through FIG. 10.

First the second acquiring portion 25 of the content streaming server 20 requests, from the content storing server 30, data for at least one video content wherein prescribed conditions are satisfied corresponding to the video data received from the first acquiring portion 21, and receives the at least one video data from the content storing server 30 (Step SB1).

Here the second acquiring portion 25 receives a dance video from the first acquiring portion 21, and sends, to the content storing server 30 as retrieval conditions, tag information for identifying the content of the dance video that has been received, for example, information on the streamers that streamed the dance video content in the past, song titles, dance genres, dancer names, dancer sex, streaming dates, dance video data received from the first acquiring portion 21, number of video data requested, and the like.

The second acquiring portion 25 sends, to the starting frame identifying portion 26 and the second generating portion 27, the dance video data received from the first acquiring portion 21 (the first video data) and the at least one dance video data received from the content storing server 30 (the second video data). In this case, the second acquiring portion 25 assigns respective information (flags, or the like) for enabling the first video data and the second video data to be identified, and send it to the starting frame identifying portion 26 and the second generating portion 27.

The starting frame identifying portion 26, for the first video data received from the second acquiring portion 25 and the second video data, respectively, specifies, as the starting frames, the frame corresponding to the timings with which the dancing starts in the video playback. The starting frame identifying portion 26 may identify the starting frames by identifying, for example, through the video, the timings with which the tunes or songs start, or may identify the starting frames by identifying the timings with which dancers begin to move (Step SB2).

The starting frame identifying portion 26 defines associations between the video data identifying information and the starting frame information for the respective first video data and second video data, and sends them to the second generating portion 27.

The second generating portion 27 receives the first video data and the second video data from the second acquiring portion 25, receives, from the starting frame identifying portion 26, information for the starting frames, in association with the identifying information for the video data, and generates content from multi-video data wherein the first video data and the second video data are combined so as to synchronize the timings of the starting frames (Step SB3). The second generating portion 27 sends the generated multi-video data to the streaming portion 23.

Note that if, for example, the tempos of the tunes (beats per time) in a dance video MD1 and a dance video MD2 are different, the second generating portion 27 may adjust the playback speed of one video to match the tempo of the tune in the other video, or may adjust the playback speeds of all of the videos so that the tempos in the tunes of all of the videos will be at a prescribed speed.

The streaming portion 23 streams, to the viewer terminals 40 from which the streaming requests have been received, the multi-video data that have been received (Step SB4). Note that the streaming controlling portion 24 may control the streaming portion 23 so as to switch to the first video data, to distribute the multi-video data to the viewer terminals 40 that sent, to the content streaming server 20, streaming requests for the first video data. The viewer terminal 40 that sent the streaming request for the first video data is requested to select streaming of either the first video data or the multi-video data, and the streaming controlling portion 24 controls the streaming portion 23 so as to distribute the video data selected by the viewer terminal 40.

An example of a playback screen for multi-video data wherein two dance videos MD1 and MD2 have been combined is depicted schematically in FIG. 10. In this example, a dance video MD1, for example, that is transmitted from the content streaming terminal 10 and a dance video MD2 that serves as a model are arranged lined up together. Generating multi-video data wherein the timings with which the dancing starts in, for example, the dance video MD1 and the dance video MD2 makes it possible to create content for comparing dancing by the content screener and the model dance, or content as if the content streamer and a famous dancer are dancing together.

Note that while FIG. 10 shows an example wherein the plurality of videos MD1 through MD2 are arranged lined up in a state wherein they do not overlap, the plurality of videos MD1 through MD2 may be arranged instead so that they are at least partially overlapping, or the arrangement may be such that at least one of the videos MD1 through MD2 is caused to be transparent and to overlap another video. Moreover, while in FIG. 6 the dance video MD1 is displayed on the screen more largely than the dance video MD2, the sizes with which the plurality of videos is displayed are not limited thereto, but rather may be adjusted as appropriate depending on the number of videos to be displayed on the screen.

Moreover, the multi-video data generated using the first video data and the second video data is not limited to combinations of pluralities of dance videos, but rather may be combinations of multiple videos of live games, combinations of multiple videos of live sports, such as track and field or swimming, or multiple videos showing the players performing together with the music being performed.

For example, content that appears as if a band is performing or an orchestra is performing can be generated through playing back multi-video data that combines a plurality of videos that show the states of performances on a plurality of different musical instruments.

Additionally, video data displaying the streamer or avatar thereof singing a popular song may be used for the first video, and video data displaying the actual singer that sang a popular song may be used as the second video data. This makes it possible to make it look as if the streamer and the actual singer are performing a duet.

In the present embodiment, as described above, the content streaming server 20 can acquire first video data, received from the content streaming terminal 10, and at least one second video data satisfying prescribed conditions, corresponding to the first video data, to generate automatically content from multi-video data wherein the first video data and the second video data are combined so that the timings of the beginnings of prescribed actions are synchronized.

This can reduce the time and effort required for selecting that which is appropriate from a vast amount of content from the past, and for carrying out editing operations to incorporate the past video content into new video content, when, for example, creating new video content by combining a plurality of video content that includes video content from the past.

Additionally, the second video data used in generating the multi-video data is extracted automatically from that which satisfies prescribed conditions, making it possible that second video data that will produce an unexpected combination, not intended by the current content creator or the viewer, will be extracted, making it possible to generate highly interesting video content, in the same way as with the first embodiment, described above.

That is, the present embodiment enables provision of a content generating device, content streaming server, content generating method, and content generating program for generating highly interesting video content.

Note that, the present invention is not limited to the various embodiments described above, but rather, during the implementation stage, can be modified in a variety of ways that do not deviate from the spirit or intent thereof. Moreover, the various embodiments may be combined as appropriate, in which case combined effects may be produced. Moreover, various inventions are included in the embodiments set firth above, where various inventions can be extracted from combinations selected from the plurality of constituent matters disclosed. For example, if the problem is solved, and effects are produced, despite several of the constituent matters being removed from the full set of constituent matters disclosed in the embodiments, the features after these constituent matters have been removed can be extracted as an invention.

EXPLANATION OF REFERENCE SYMBOLS

10: Content Streaming Terminal
20: Content Streaming Server
21: First Acquiring Portion
22: First Generating Portion
23: Streaming Portion
24: Streaming Controlling Portion
25: Second Acquiring Portion
26: Starting Frame Identifying Portion
27: Second Generating Portion
30: Content Storing Server
31: Communicating Portion
32: Retrieving Portion
33: Storing Portion
40: Viewer Terminal

The invention claimed is:

1. A content generating device comprising:
an acquiring portion configured to acquire, from an accumulating portion configured to accumulate video data, a first plurality of video data that satisfies a prescribed condition;
a starting frame identifying portion configured to specify a starting frame wherein a prescribed action starts, for each video playback of the first plurality of video data acquired by the acquiring portion; and
a generating portion configured to generate multi-video data by combining the first plurality of video data so that the timings of the specified starting frames will be synchronized,
wherein the multi-video data is configured to display each video playback of the first plurality of video data simultaneously,
wherein the first plurality of video data comprises a plurality of video feeds,
wherein the acquiring portion is further configured to receive inputted information sent sequentially from a plurality of viewer terminals,
wherein the generating portion is further configured to combine the inputted information with the multi-video data,
wherein the starting frame identifying portion is configured to specify the starting frame by identifying a sound or an image included in the content, and
wherein playback speeds of each video playback of the first plurality of video data are adjusted to a prescribed speed.

2. A content streaming server, comprising:
a content generating device set forth in claim 1;
a streaming portion configured to stream the multi-video data generated by the content generating device; and
a streaming controlling portion configured to control the streaming portion to stream the multi-video data to the plurality of viewer terminals.

3. The content streaming server according to claim 2, further comprising:
a first acquiring portion configured to acquire, from a content streaming terminal, first video data for streaming, wherein:
the acquiring portion is configured to:
acquire the first video data from the first acquiring portion,
request, from the accumulating portion, a second plurality of video data that corresponds to the first plurality of video data and satisfies the prescribed condition, to acquire the first plurality of video data and the second plurality video data as a combined plurality of video data.

4. A content generating method comprising:
requesting, from an accumulating portion wherein a plurality of video data are accumulated, video data that satisfies a prescribed condition, to acquire a plurality of video data satisfying the prescribed condition; and
identifying a timing of a starting frame wherein a prescribed action starts, for video playback of each of the plurality of acquired video data; and
generating multi-video data wherein the plurality of video data have been combined so that the timings of the starting frames are synchronized; and
combining the multi-video data with inputted information received sequentially from a plurality of viewer terminals,
wherein the multi-video data is configured to display video playback of each of the plurality of acquired video data simultaneously,
wherein the first plurality of video data comprises a plurality of video feeds
wherein the identifying a starting frame further comprises specifying the starting frame by identifying a sound or an image included in the content, and
wherein playback speeds of each video playback of the first plurality of video data are adjusted to a prescribed speed.

5. A content generating program for causing a computer to function as:
means for requesting, from an accumulating portion wherein a plurality of video data are accumulated, video data that satisfies a prescribed condition, to acquire a plurality of video data satisfying the prescribed condition;
means for identifying a timing of a starting frame wherein a prescribed action starts, for video playback of each of the plurality of acquired video data; and
means for generating multi-video data by combining the plurality of video data so that the timings of the specified starting frames are synchronized,
wherein the first plurality of video data comprises a plurality of video feeds,
wherein the multi-video data is configured to display video playback of each of the plurality of acquired video data simultaneously,
wherein the multi-video data includes inputted information received sequentially from a plurality of viewer terminals, wherein the means for identifying a timing of a starting frame is further configured to specify the starting frame by identifying a sound or an image included in the content, and wherein playback speeds of each video playback of the first plurality of video data are adjusted to a prescribed speed.

* * * * *